United States Patent
Hammond et al.

(10) Patent No.: US 11,364,786 B2
(45) Date of Patent: Jun. 21, 2022

(54) HYBRID ELECTRIC VEHICLE WITH A COMBINED TORQUE CONVERTER AND AN ELECTRIC PROPULSION MOTOR

(71) Applicant: FORD GLOBAL TECHNOLOGIES, LLC, Dearborn, MI (US)

(72) Inventors: Matthew David Hammond, Dearborn, MI (US); Gregory Daniel Goleski, Rochester Hills, MI (US); Bryant L. Poynter, Redford, MI (US); David Gon Oh, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/096,870

(22) Filed: Nov. 12, 2020

(65) Prior Publication Data
US 2022/0144071 A1    May 12, 2022

(51) Int. Cl.
*B60K 6/405*    (2007.10)
*B60K 6/365*    (2007.10)
(Continued)

(52) U.S. Cl.
CPC ............. *B60K 6/405* (2013.01); *B60K 6/24* (2013.01); *B60K 6/26* (2013.01); *B60K 6/365* (2013.01);
(Continued)

(58) Field of Classification Search
None
See application file for complete search history.

(56) References Cited

U.S. PATENT DOCUMENTS 5,789,823 A     8/1998   Sherman
8,333,680 B2 *  12/2012  Kasuya ................. B60W 20/15
                                                         477/5
(Continued)

FOREIGN PATENT DOCUMENTS

CN    103206469 A  *  7/2013    ............. F16D 25/10
CN    111954606 A  *  11/2020   ............... B60K 6/40
(Continued)

OTHER PUBLICATIONS

Stefan Kilian, Dr-Ing (ZF Friedrichshafen AG), 8(H)P 4th Generation, Development of a future-proof Modular Transmission Kit, CTI Symposium, Novi, Michigan, May 15-16, 2019, 18 pgs.

*Primary Examiner* — Dirk Wright
(74) *Attorney, Agent, or Firm* — David B. Kelley; Brooks Kushman P.C.

(57) ABSTRACT

A transmission including an electric machine, a torque converter and a planetary gearset in a transmission housing that is connected to an engine. A turbine shaft is configured to transfer torque from the engine and the electric machine to the planetary gear set. A disconnect clutch selectively couples the input shaft from the engine to the torque converter housing of the torque converter. The disconnect clutch includes a disconnect clutch piston and a first balance dam. A torque converter clutch selectively connects the torque converter housing to the turbine and the turbine shaft. The torque converter clutch includes a torque converter clutch piston and a second balance dam. Ports in the housing permit automatic transmission fluid to flow between the turbine shaft and the torque converter clutch piston; the turbine shaft and the torque converter clutch piston; and the turbine shaft, the first balance dam, and the second balance dam.

5 Claims, 3 Drawing Sheets

(51) Int. Cl.
*B60K 6/26* (2007.10)
*B60K 6/38* (2007.10)
*F16H 57/02* (2012.01)
*F16H 47/08* (2006.01)
*B60K 6/24* (2007.10)
*F16H 57/04* (2010.01)

(52) U.S. Cl.
CPC ............... *B60K 6/38* (2013.01); *F16H 47/08* (2013.01); *F16H 57/02* (2013.01); *F16H 57/0424* (2013.01); *F16H 57/0426* (2013.01); *F16H 57/0446* (2013.01); *B60Y 2200/92* (2013.01); *B60Y 2400/424* (2013.01); *B60Y 2400/426* (2013.01); *B60Y 2400/43* (2013.01); *B60Y 2400/60* (2013.01); *B60Y 2400/73* (2013.01); *B60Y 2400/78* (2013.01); *B60Y 2400/79* (2013.01); *F16H 2057/02034* (2013.01)

(56) References Cited

U.S. PATENT DOCUMENTS

| | | | |
|---|---|---|---|
| 8,834,310 | B2 | 9/2014 | Goleski et al. |
| 8,997,956 | B2 * | 4/2015 | Iwase ...................... B60K 6/26 192/3.26 |
| 9,481,234 | B2 | 11/2016 | Ideshio et al. |
| 9,561,793 | B2 | 2/2017 | Kuwahara et al. |
| 9,915,330 | B2 | 3/2018 | Maurer et al. |
| 10,293,674 | B1 | 5/2019 | Wilton |
| 10,399,427 | B2 | 9/2019 | Payne et al. |
| 10,428,922 | B2 | 10/2019 | Ramsey et al. |
| 10,486,520 | B2 | 11/2019 | Moasherziad et al. |
| 10,723,216 | B2 | 7/2020 | Nelson et al. |
| 11,111,992 | B2 * | 9/2021 | Steiner .................... F16D 21/00 |
| 11,114,917 | B1 * | 9/2021 | Moasher .................. B60K 6/38 |
| 2012/0319514 | A1 * | 12/2012 | Iwase ..................... H02K 7/006 310/78 |
| 2015/0114780 | A1 | 1/2015 | Cobbs et al. |
| 2019/0249773 | A1 | 8/2019 | Morrison et al. |
| 2020/0040976 | A1 * | 2/2020 | Steiner .................... B60K 6/48 |
| 2020/0094668 | A1 * | 3/2020 | Podschwadt ............ F16H 41/24 |
| 2021/0143717 | A1 * | 5/2021 | Steiner ................... B60K 6/387 |
| 2021/0197657 | A1 * | 7/2021 | Nelson ................... B60K 6/387 |

FOREIGN PATENT DOCUMENTS

| | | | | |
|---|---|---|---|---|
| DE | 102018217388 | A1 * | 4/2020 | ............ F16D 25/12 |
| JP | 2015081088 | A * | 4/2015 | ............ B60K 6/26 |
| WO | 190197104 | | 10/2019 | |
| WO | WO-2019197103 | A1 * | 10/2019 | ............ F16D 25/10 |
| WO | WO-2020187605 | A1 * | 9/2020 | ............ B60K 6/387 |
| WO | WO-2021043357 | A1 * | 3/2021 | ............ F16D 13/74 |

* cited by examiner

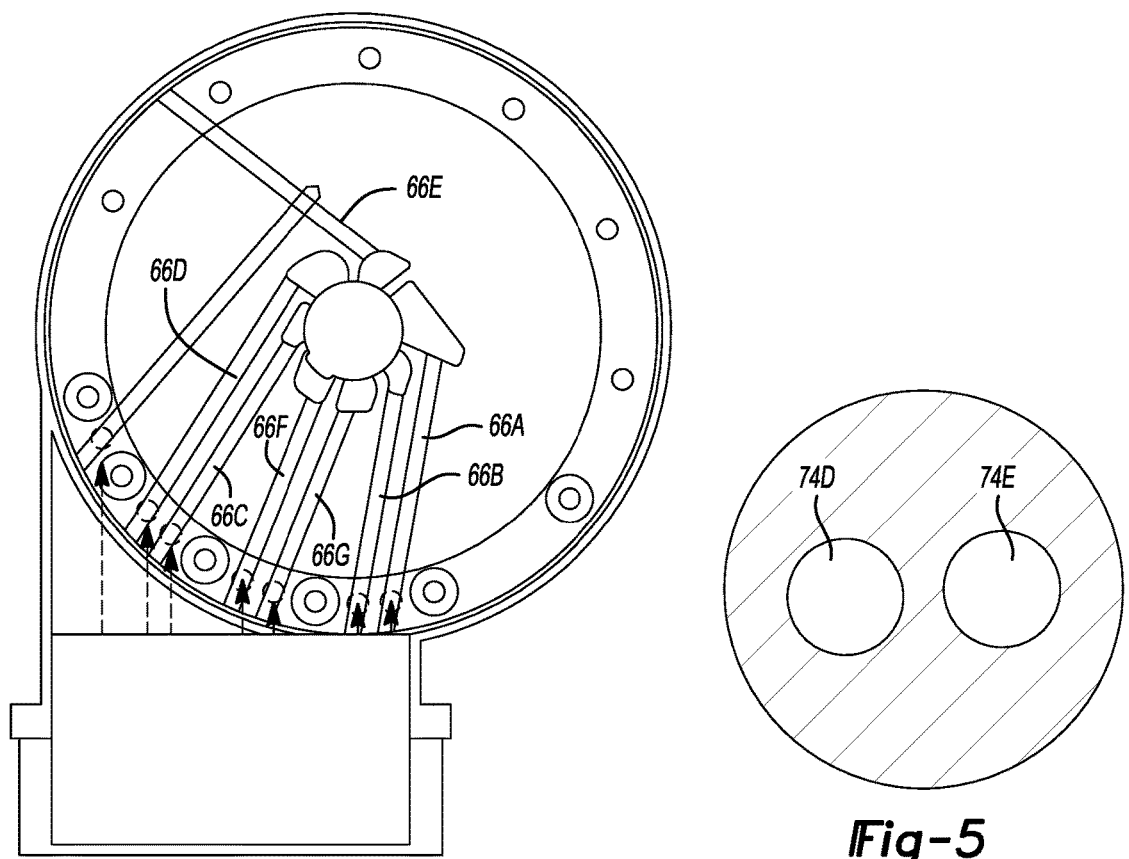
Fig-3
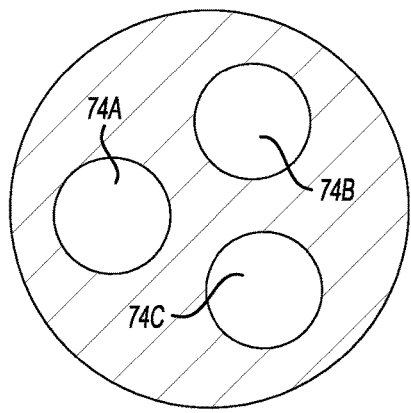
Fig-4
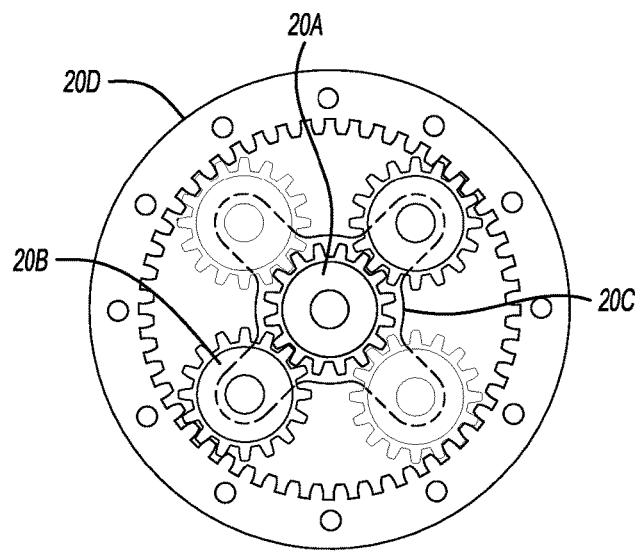
Fig-6
Fig-5

HYBRID ELECTRIC VEHICLE WITH A COMBINED TORQUE CONVERTER AND AN ELECTRIC PROPULSION MOTOR

TECHNICAL FIELD

This disclosure relates to a driveline for a hybrid vehicle that includes an internal combustion engine and an electric propulsion motor that are configured to be selectively or jointly engaged with a transmission.

BACKGROUND

Hybrid vehicles include both an internal combustion engine and an electric motor that jointly or alternatively function to propel the vehicle. The electric motor may be used to propel the vehicle provided there is enough stored energy in the propulsion battery to power the electric motor. The internal combustion engine may provide torque to propel the vehicle when the battery is depleted, when there is insufficient torque provided by the motor, or to charge the battery with a regenerative braking system.

In some hybrid vehicles, the internal combustion engine, electric motor and transmission are separate assemblies that each have a separate housing. The separate assemblies are stacked and assembled. Stacking the assemblies requires considerable space within the vehicle and adds weight. Added weight reduces energy efficiency and vehicle range.

Heat created by the electric motor makes it necessary to cool the motor. The electric motor is housed in a relatively inaccessible location which makes cooling the motor a challenge. Coolant circulation systems have been proposed to cool the electric motor, but such systems add cost and weight to the vehicle.

Prior art electric machines included one damper between the internal combustion engine and the electric motor and a second damper between the electric motor and the torque converter. The second damper added weight and increased the space requirements for the vehicle's propulsion system.

This disclosure is directed to solving the above problems and other problems as summarized below.

SUMMARY

According to one aspect of this disclosure, a transmission is disclosed for a hybrid vehicle having an engine. The transmission includes a housing attached to the engine that encloses an electric machine operatively connected to the engine. A torque converter is disposed in the housing and is receives torque from the engine. A turbine shaft transfers torque from the engine and the electric machine to a planetary gear set in the housing. A disconnect clutch selectively couples the input shaft from the engine to the torque converter housing of the torque converter. The disconnect clutch includes a disconnect clutch piston and a first balance dam. A torque converter clutch selectively connects the torque converter housing to the turbine and the turbine shaft. The torque converter clutch includes a torque converter clutch piston and a second balance dam. A first port in the housing permits automatic transmission fluid to flow between the turbine shaft and the disconnect clutch piston. A second port in the housing is configured to permit the fluid to flow between the turbine shaft and the torque converter clutch piston. A third port in the housing permits the fluid to flow between the turbine shaft, the first balance dam, and the second balance dam.

According to other aspects of this disclosure, the hybrid vehicle may further comprise a thrust bearing disposed radially within the electric machine that splashes the fluid inside the electric machine from a feed channel that extends from the third port toward the thrust bearing.

The turbine shaft may define three axial channels, a first axial channel provides fluid to the disconnect clutch piston, a second axial channel provides fluid to the torque converter clutch piston, and a third axial channel provides fluid to both the first balance dam and the second balance dam.

The hybrid vehicle may further comprise an off-axis pump and a valve body that receives fluid from the off-axis pump and provides the fluid to the first axial channel, the second axial channel, and the third axial channel.

The hybrid vehicle may further comprise a torque converter-in port, and a torque converter-out port. The valve body receives the fluid from the off-axis pump and provides the fluid to the torque converter-in port and receives fluid from torque converter-out port.

The electric machine and the torque converter are directly adjacent to each other and are not separated by a vibration damper.

According to another aspect of this disclosure, a hybrid vehicle is disclosed that includes an engine, a housing attached to the engine, and an electric machine disposed in the housing. A damper is connected between the engine and the electric machine. A torque converter is disposed in the housing and is adapted to receive torque from the engine. A turbine shaft transfers torque from the engine and the electric machine to a planetary gear set that is also disposed in the housing. A disconnect clutch selectively couples the input shaft from the engine to the torque converter housing. The disconnect clutch includes a disconnect clutch piston and a first balance dam defined by the housing. A torque converter clutch selectively locks the torque converter housing to the turbine and to the turbine shaft. The torque converter clutch includes a torque converter piston and a second balance dam defined by the housing. A first port in the housing permits automatic transmission fluid to flow between the turbine shaft and the disconnect clutch piston. A second port in the housing permits the fluid to flow between the turbine shaft and the torque converter clutch piston. A third port in the housing permits the fluid to flow between the turbine shaft, the first balance dam, and the second balance dam.

According to other aspects of this disclosure, the hybrid vehicle may further comprise a thrust bearing disposed radially inside a rotor of the electric machine, and a feed channel extending from the third port toward the thrust bearing to splash the fluid inside the rotor of the electric machine.

According to another aspect of this disclosure, a hydraulic system is disclosed for an electric machine, an engine and a planetary gear set. The hydraulic system comprises a pump for fluid and a computer-controlled valve body that receives fluid from the pump. A front support wall of the planetary gear set that defines a plurality of radially extending channels that are in fluid flow communication with the valve body. A turbine shaft defines a plurality of axially extending channels that are each in fluid flow communication with one of the radially extending channels. A torque converter is in fluid flow communication with a first one of the axially extending channels that actuates a disconnect clutch. A second one of the axially extending channels actuates a torque converter clutch. A third one of the axially extending channels is in fluid flow communication with a balance dam of the disconnect clutch and a balance dam of the torque converter clutch.

The hydraulic system may further comprise a transmission housing having a first portion enclosing the torque converter and a second portion housing the planetary gear set; wherein the front support wall is disposed between the first portion and the second portion.

The hydraulic system may further comprise a first port in the first portion of the transmission housing provides fluid flow between the disconnect clutch and the first axially extending channel; a second port in first portion of the transmission housing provides fluid flow between the torque converter clutch and the second axially extending channel; and a third port in the first portion of the transmission housing provides fluid flow between the balance dam of the disconnect clutch and the balance dam of the torque converter clutch.

A fourth axially extending channel may provide fluid from the valve body to the planetary gear set and a fifth channel may provide for the return of fluid from the planetary gear set to the valve body. The fourth axially extending channel and the fifth axially extending channel are each in fluid flow communication with one of the radially extending channels in the front wall.

The hydraulic system may further comprise a torque converter-in channel defined by the transmission housing that provides fluid to an impeller of the torque converter; and a torque converter-out channel defined by the transmission housing that receives fluid from a turbine of the torque converter.

The above aspects of this disclosure and other aspects will be described below with reference to the attached drawings.

BRIEF DESCRIPTION OF THE DRAWINGS

FIG. 3 is a cross-sectional view taken along the line 3-3 in FIG. 2.

FIG. 4 is a cross-sectional view of a turbine shaft taken along the line 4-4 in FIG. 2.

FIG. 5 is a cross-sectional view of a turbine shaft taken along the line 5-5 in FIG. 2.

FIG. 6 is a schematic view of a planetary gear set.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure could be incorporated in particular applications or implementations.

Figure 1:
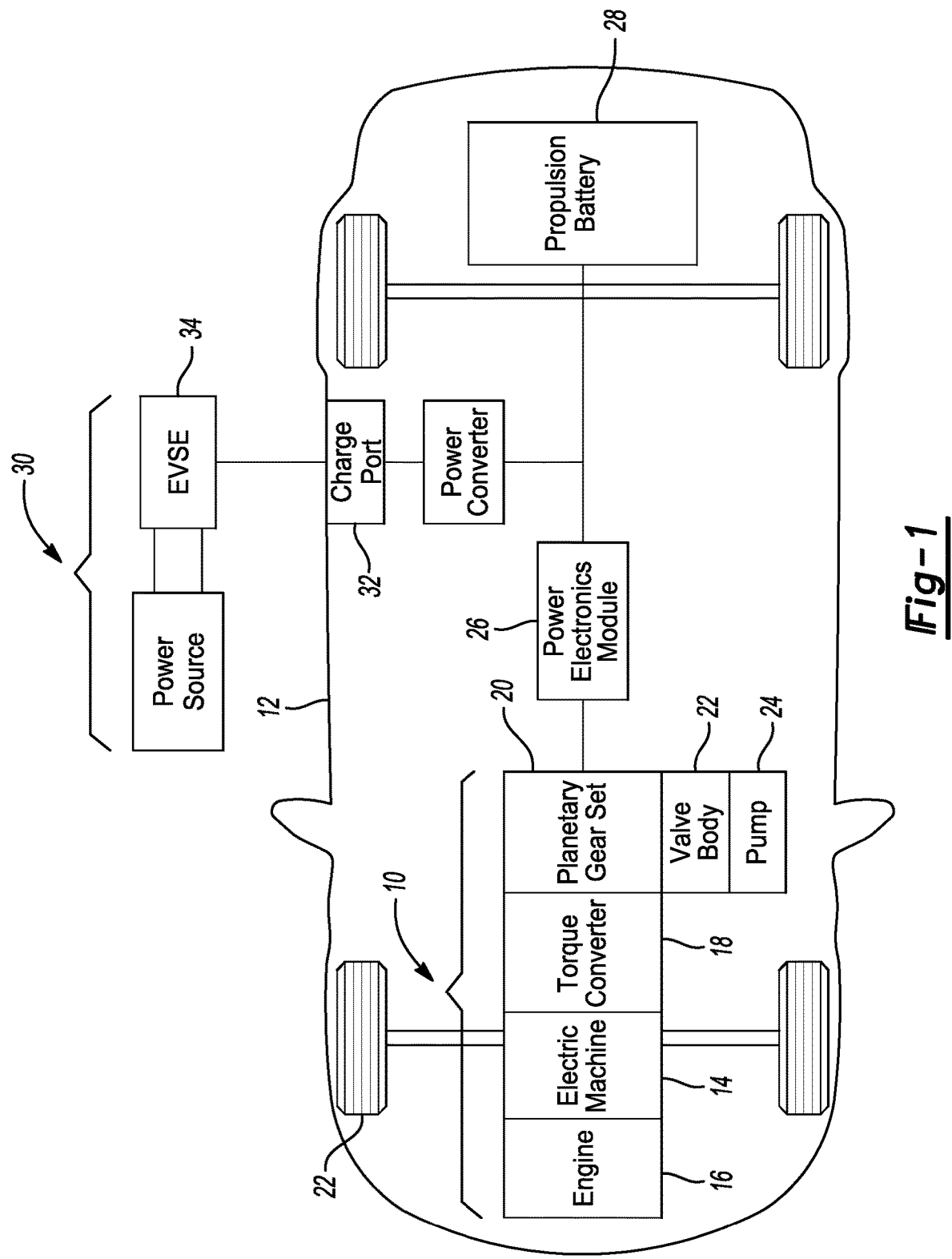
FIG. 1 is a schematic diagram of an electric vehicle.

Referring to FIG. 1, a propulsion system 10 for a hybrid vehicle 12 is illustrated that includes an electric machine 14 for propelling the vehicle 12, an internal combustion engine ("ICE") 16, a torque converter 18, a multi-speed planetary gear set 20, a valve body 22, and an off-axis transmission fluid pump 24. Power is provided to the electric machine 14 through a power electronics module 26 from a propulsion battery 28. The propulsion battery 28 may include a plug-in charging station 30 including a power source, such as the electrical power grid (not shown) and electrical vehicle supply equipment ("EVSE"). If the vehicle 12 is a plug-in hybrid, a charge port 32 and a power converter 34 may be provided to charge the battery 28.

Figure 2:
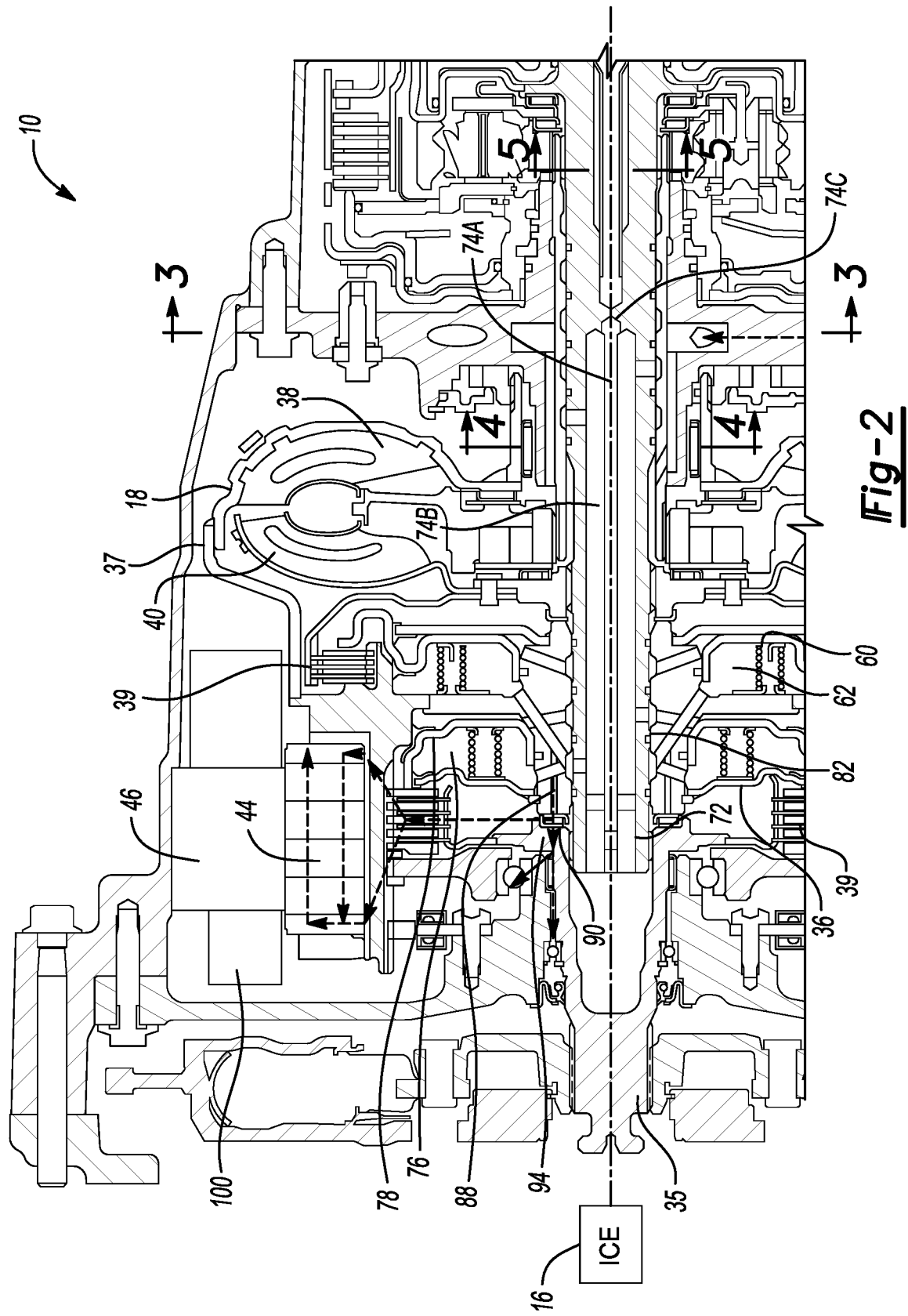
FIG. 2 is a diagrammatic cross-sectional view of a propulsion system for an electric vehicle.

Referring to FIG. 2, the ICE 16 is of conventional design and may be a gasoline or diesel engine. The ICE 16 is configured to be attached to the propulsion system 10 with an input shaft 35 that is selectively connected to the torque converter 18 by a disconnect clutch 36 (hereinafter a "KO clutch"). When the KO clutch 36 is engaged, torque from the ICE 16 is provided to the torque converter housing 37 which is connected to the impeller 38 of the torque converter 18. The impeller 38 drives the turbine 40 of the torque converter 18 through the TC stator 42 that multiplies the torque for better acceleration.

The electric machine 14 includes a rotor 44 that is connected to the housing 37 of the torque converter 18 and a stator 46 of the electric machine 14. The electric machine 14 may propel the vehicle 12 (shown in FIG. 1) independently, in conjunction with the ICE 16, or the ICE 16 may propel the vehicle 12 independently.

A housing 48 encloses the electric machine 14 and torque converter 18. A damper 54 is disposed between the ICE 16 and the housing 48 to dampen vibrations from the ICE 16. According to one aspect of this disclosure, no damper is provided between the electric machine 14 and the torque converter 18. Elimination of the damper as previously provided in the prior art allows parts of the torque converter 18 to be disposed radially inside the electric machine 14 to reduce the overall length of the propulsion system 10.

The ICE 16 provides torque through the input shaft 35 to the KO clutch 36. The KO clutch 36 is engaged to provide torque to the torque converter 18 and is released to interrupt or limit the torque provided by the ICE 16 to the torque converter 18. The KO clutch 36 includes a clutch pack 39 that includes clutch plates and friction material that connect the ICE 16 input shaft 35 to the torque converter 18. The KO clutch 36 includes a KO piston 78 and a KO balance dam 76. The KO clutch 36 is controlled by automatic transmission fluid (hereinafter "ATF") pressurized by an off-axis pump 24 and controlled by a computer-controlled valve body 22.

Referring to FIGS. 2 and 3, ATF is provided through channels 66 in a front support 68 of the portion of the housing 48 enclosing the gear set 20. The channels 66 provide fluid to the turbine shaft 72. The channels 66 include a torque converter in channel 66A, a torque converter out channel 66B, a TC clutch piston channel 66C, a KO clutch piston channel 66D, and a balance dam channel 66E. Two channels 66F and 66G are in fluid flow communication through the turbine shaft 72 (shown in FIG. 5) to the gear set 20 as will be described below. The gear set 20, as illustrated, is of conventional design and includes a plurality of planetary gear sets.

Referring to FIGS. 2 and 4, the turbine shaft 72 defines a plurality of feeds 74 that extend axially through the shaft 72. One of the feeds 74A is in fluid flow communication with the TC piston 60. A second feed 74B is in fluid flow communication with the KO piston 78. A third feed 74C is in fluid flow communication with both the TC balance dam 62 and KO balance dam 76. In one embodiment, the third feed 74C also supplies ATF top lubricate the electric machine 14. The turbine shaft 72 also includes two feeds 74D and 74E (shown in FIG. 5) that are in fluid flow communication with the gear set 20.

Torque converter clutch 56, or "TC clutch," is engaged to transfer torque directly from the torque converter housing 37 to the turbine 40 and the turbine shaft 72. The TC clutch 56 is engaged to improve efficiency by eliminating energy losses inherent in the torque converter 18 operation. Engaging the TC clutch 56 locks the torque converter housing 37 to the turbine shaft 72.

The torque converter clutch 56 includes TC piston 60 in fluid communication with TC piston feed 74A for actuating the TC clutch 56. When the TC clutch 56 is actuated, the torque converter 18 is bypassed and torque from the ICE 16 is mechanically connected, or locked, by the TC clutch 56 to the turbine shaft 72.

The balance dam feed 74C is in fluid flow communication with both the torque converter balance dam 62 (hereinafter "TC balance dam") and the KO balance dam 76. Three or four cross-drilled holes 82 are defined by the turbine shaft 72. The cross drilled holes 82 in the turbine shaft are open with the feed 74A being open to the TC piston 60, feed 74B being open to the KO clutch piston 78, and feed 74C being open to balance dams 62 and 76.

In one embodiment, a lubrication feed 88 receives ATF through the cross-drilled holes 82 and supplies ATF to a thrust bearing 90 disposed between the turbine shaft 72 and the input shaft 35. The electric machine 14 includes magnets (not shown) in the rotor 44 that are heated as a result of electric machine 14 operation and require cooling. The thrust bearing 90 splashes the ATF outwardly to cool and lubricate the electric machine 14. The balance dam feed 74C provides fluid flow communication with the TC balance dam 62, The KO balance dam 76, and the lubrication feed 88.

The TC piston 60 is actuated to apply the TC clutch 56. When the TC clutch 56 is actuated, ATF is supplied through the TC piston feed 74A and fluid in the TC balance dam 62 flows back to the feed 74C. Similarly, when the KO clutch 36 is actuated, ATF is provided through the KO piston feed 74B to the KO piston 78 and fluid in the KO balance dam 76 flows back to the feed 74C.

Referring to FIG. 6, (shown in FIG. 5) the planetary gear sets 20 each include a sun gear 20A about which planet gears 20B rotate within a ring gear 20D. A carrier 20C connects the planet gears 20B. The sun gears 20A, ring gears 20D and carriers 20C are selectively locked to change the gear ratio as is well-known in the art.

The valve body 22 receives pressurized ATF from the pump 24 and selectively supplies ATF to clutches associated with the torque converter in-channel 66A, the torque converter out-channel 66B, the TC piston channel 66C, the balance dam channel 66E, and the two channels 66F and 66G that are in fluid flow communication with the planetary gear set 20.

The KO clutch 36 is assembled radially inside the windings 100 of the stator 42 to reduce the overall length of the propulsion system 10. The TC clutch 56 is assembled at least partially radially inside the windings 92. In the illustrated example, the clutch pack 58 and balance dam 62 are disposed at a location radially inside the electric machine 14. By eliminating a damper from between the electric machine 14 and the torque converter 18, space is requirements are reduced by locating the KO clutch 36 and TC clutch 56 fully or partially radially inside the windings 92 of the electric machine 14.

The propulsion system 10 has three modes of operation including a first mode—engine 16 only; a second mode—electric machine 14 only; and a third mode—with both the engine 16 and electric machine 14 providing torque to the turbine shaft 72 and planetary gear set 20.

In the first mode of operation, the KO clutch 36 is engaged and torque from the ICE 16 is provided through the torque converter housing 37 to the torque converter 18. The impeller 38 drives the turbine 40 through the TC stator 42 and provides torque to the turbine shaft 72 and planetary gear set 20. When the TC clutch 56 is engaged, the torque converter housing 37 provides torque directly to the turbine shaft 72 and the planetary gear set 20.

In the second mode of operation, torque from the electric machine 14 is provided to the turbine shaft 72 through the torque converter 18.

In the third mode of operation, torque from the ICE 16 is provided to the torque converter housing 37 by engaging the KO clutch 56 while torque from the electric machine 14 is provided directly to the torque converter housing 37. Torque from the torque converter housing 37 is provided to the turbine shaft 72 through the torque converter 18.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A hydraulic system for an electric machine, an engine and a transmission comprising:
   a front support wall of a planetary gear set defining a plurality of radially extending channels that are in fluid flow communication with the valve body;
   a turbine shaft defining a plurality of axially extending channels, wherein each axially extending channel is in fluid flow communication with one of the radially extending channels; and
   a torque converter being in fluid flow communication with a first of the axially extending channels that actuates a disconnect clutch, a second of the axially extending channels that actuates a torque converter clutch, and a third of the axially extending channels that is in fluid flow communication with a balance dam of the disconnect clutch and a balance dam of the torque converter clutch.

2. The hydraulic system of claim 1 further comprising:
   a transmission housing having a first portion enclosing the torque converter and a second portion housing the planetary gear set, wherein the front support wall is disposed between the first portion and the second portion.

3. The hydraulic system of claim 2 wherein a fourth of the axially extending channels supplies fluid from the valve body to the planetary gear set and a fifth of the axially extending channels returns fluid from the planetary gear set to the valve body.

4. The hydraulic system of claim 3 wherein the fourth of the axially extending channels and the fifth of the axially extending channels are each in fluid flow communication with one of the radially extending channels in the front support wall.

5. The hydraulic system of claim 2 further comprising:
a torque converter-in channel defined by the transmission housing that provides fluid to an impeller of the torque converter; and
a torque converter-out channel defined by the transmission housing that receives fluid from a turbine of the torque converter.

* * * * *